Sept. 16, 1924. 1,508,452
A. L. HARRINGTON
ELECTRICALLY HEATED RECEPTACLE AND HOT PLATE
Filed March 23, 1923 2 Sheets-Sheet 1

INVENTOR
A. L. Harrington
by
James C. Bradley
atty

Sept. 16, 1924.  1,508,452
A. L. HARRINGTON
ELECTRICALLY HEATED RECEPTACLE AND HOT PLATE
Filed March 23, 1923 2 Sheets-Sheet 2
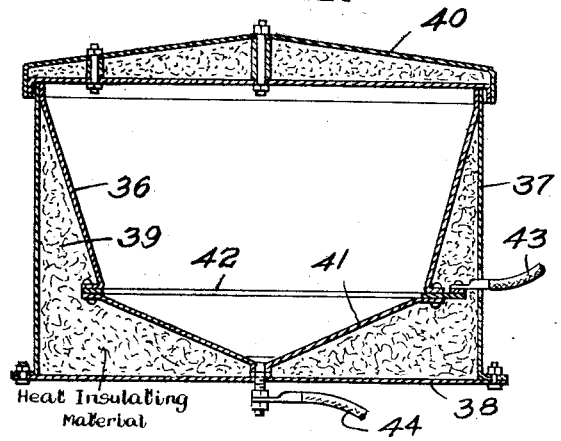
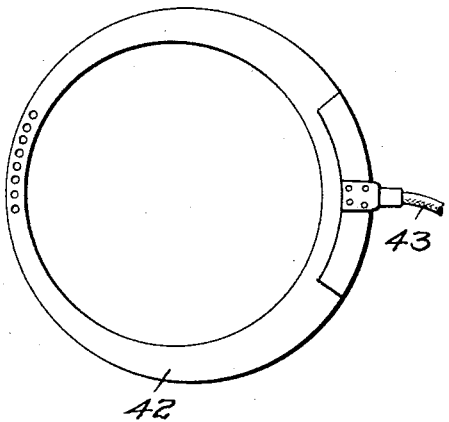
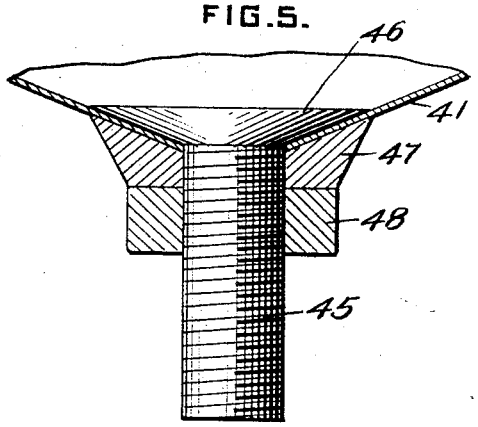
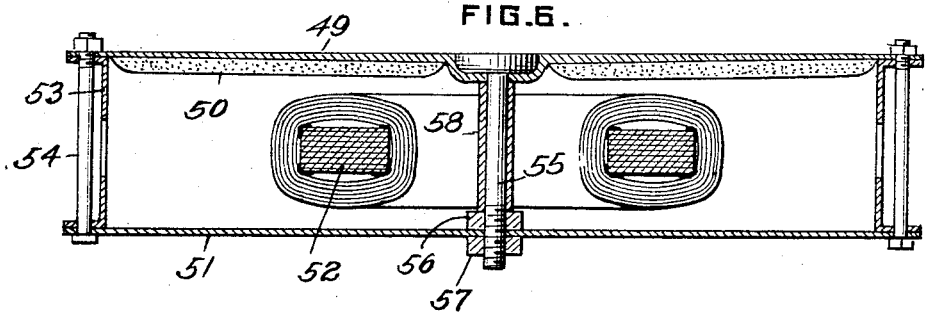
INVENTOR
A. L. Harrington.
by
James C. Bradley
atty.

Patented Sept. 16, 1924.

1,508,452

UNITED STATES PATENT OFFICE.

ALFRED L. HARRINGTON, OF ROSSLYN FARMS, PENNSYLVANIA, ASSIGNOR TO PITTSBURGH PLATE GLASS COMPANY, A CORPORATION OF PENNSYLVANIA.

ELECTRICALLY-HEATED RECEPTACLE AND HOT PLATE.

Application filed March 23, 1923. Serial No. 627,081.

*To all whom it may concern:*

Be it known that I, ALFRED L. HARRINGTON, a citizen of the United States, and a resident of Rosslyn Farms, in the county of Allegheny and State of Pennsylvania, have made a new and useful invention in Improvements in Electrically-Heated Receptacles and Hot Plates, of which the following is a specification.

Figure 1:
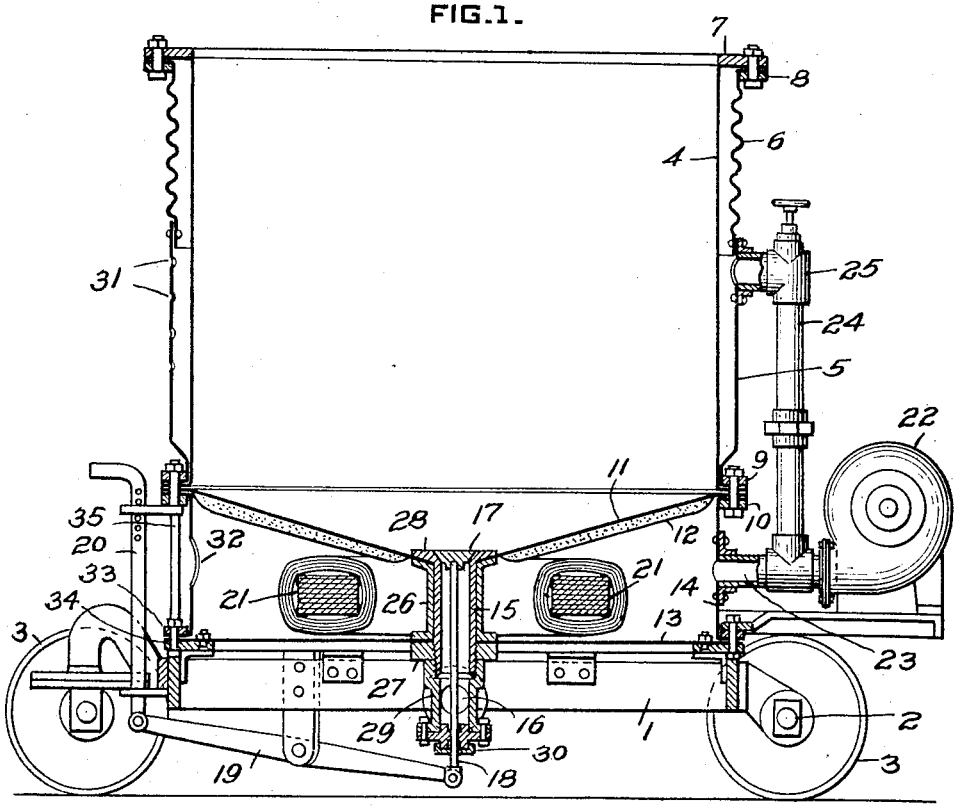
Figure 2:
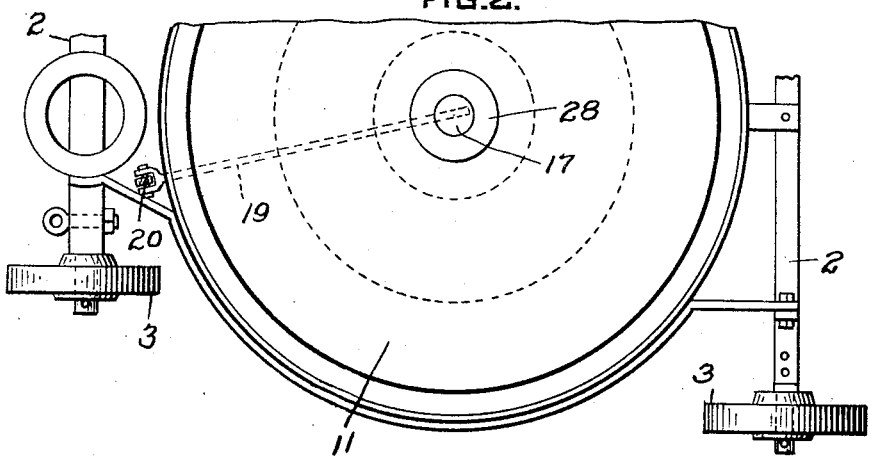

The invention relates to electrically heated receptacles and hot plates and is particularly designed for use in the paint or varnish business, although capable of wide application and is not limited to use in connection with paint or varnish kettles or even to receptacles, being applicable as well to hot plates. The principal objects of the invention are to produce an improved construction giving a close control over temperatures; which promotes self mixing; which provides for rapid cooling when this becomes necessary; and which leaves the bottom of the kettle unobstructed to permit proper stirring. Certain embodiments of the invention are illustrated in the accompanying drawings wherein:

Figure 1 is a vertical section through a varnish kettle with the invention applied thereto. Fig. 2 is a partial plan view. Fig. 3 is a vertical section through a modified construction. Fig. 4 is a plan view of a detail of the Fig. 3 construction. Fig. 5 is an enlarged section through the connection at the bottom of the Fig. 3 apparatus. And Fig. 6 is a vertical section through a hot plate construction with the invention applied thereto.

In its preferred form, the invention contemplates the heating of a kettle or receptacle by the application of a secondary current induced through the bottom of the kettle which is made of high resistance material. A primary exciting coil is located beneath this high resistance bottom with the second bottom below such coil and connections are provided at the center of the two plates and at their peripheries, thus providing a closed secondary circuit. The current induced in the high resistance bottom flows between the center and periphery thereof heating the central portion more than the outer portion if the bottom is made of uniform thickness, thus tending to promote a circulation of the liquid in the kettle, an upward flow being produced at the center and a downward flow at the periphery. When the invention is applied to a hot plate, the principle of operation involved is the same except that it is preferable to increase the thickness of the high resistance plate from the edge to the center so that the heating effect upon the plate will be the same throughout rather than hotter at the center as is the case where the invention is applied to a kettle. The bottom of the high resistance plate is preferably covered with insulating material such as asbestos plaster, and means are provided for causing a circulation of air through the space between the bottom plates occupied by the primary coil in order to cool such coil. The same circulation means is also preferably employed for cooling the sides of the receptacle which are preferably made in the form of a double wall with a space between through which the air is circulated when it is desired to cool the contents of the kettle rapidly.

Referring to Figs. 1 and 2 which illustrate the invention as applied to a varnish kettle, the principal arts may be enumerated as follows: 1 is the supporting framework in the form of a heavy ring provided with the axles 2 carrying the wheels 3; 4 is the inner side wall of the receptacle; 5 and 6 are sections of the outer side wall; 7 and 8 are clamping rings at the upper end of the side walls; 9 and 10 are similar rings at the lower end thereof; 11 is the bottom wall of the kettle or receptacle of high resistance material such as nichrome; 12 is an insulating coating of asbestos plaster or similar material on the bottom of the plate 11; 13 is a second bottom wall spaced below the wall 11; 14 is a supplemental side wall connecting the walls 11 and 13; 15 is an outlet pipe provided with a branch 16 leading laterally; 17 is a valve for the pipe carried by the stem 18 and operated from the lever 19 having the handle 20; 21 is a primary exciting coil located between the walls 11 and 13 and encircling the outlet pipe 15; 22 is a motor driven blower having the connection 23 leading to the space between the two bottom plates 11 and 12 and the connection 24 leading to the space between the walls 4 and 5; and 25 is a valve for regulating or cutting off the supply of air flowing to the space between the walls 4 and 5. The walls 4, 5, 13 and 14 are all preferably made of sheet copper, while the outlet pipe 15 and the surrounding sleeve 26 are also preferably of copper. The sleeve 26 acts as a spacer between the walls 11 and 13 and is pressed tightly up against the bottom of the wall 11 by means of the nut 27. The flange 28 at the upper end of the pipe 15 which opposes the flange of the sleeve 26 is preferably brazed to the plate 11. The lower end of the pipe 15 is provided with a sleeve 29 threaded thereto and carrying at its lower end a suitable stuffing box 30.

The primary exciting coil 21 surrounds the pipe 15 and sleeve 26 and is supplied with current from a suitable source, not shown. This coil is preferably circular in form with an iron core, but may be made in accordance with various designs. The plate 11 of high resistance material is preferably made of uniform thickness from center to circumference so that when a current flows therethrough between the center and circumference, the central portion is heated to a higher temperature than the periphery. This is regarded as desirable as the greater heat at the center tends to improve the circulation in the kettle, giving a more vigorous flow upward through the center with a corresponding reverse flow at the outside. If it is desired to heat the bottom uniformly, the plate 11 may be made of gradually increasing thickness from its periphery to its center. The current induced by the primary coil 21 flows through the secondary circuit which comprises the pipe 15 and sleeve 26 at the center, the bottom 13, the supplemental side wall 14, and the high resistance bottom wall 11.

In order to prevent heat losses downwardly from the plate 11, such plate is preferably covered on its lower side with the insulating material 12, which also serves the additional function of shielding the primary coil 21 from the heat of the plate 11. Additional cooling of the primary coil is secured from the blower 22, which air may be applied without materially cooling the bottom plate 11 because of the use of the insulating material 12.

It often becomes desirable also to cool the contents of the kettle, particularly at the conclusion of the heating operation, and this is facilitated by the use of the double walls to which leads the pipe 24 from the blower 22. When it is desired to avoid cooling the contents, the valve 25 is closed, and under such conditions, the double wall of the kettle prevents heat losses because of the insulating layer of air between such walls. In order to permit of the circulation of air between the walls, the outlet perforations 31 are provided in the wall 5 opposite the pipe 24. The supplemental wall 14 is similarly provided with a perforation 32 to permit a flow of air from the space between the walls 11 and 13 and so facilitate the cooling operation.

A pair of clamping rings 33 and 34 are provided at the lower end of the supplemental wall 14, and these clamping rings are connected to the clamping rings 9 and 10 by means of the rods 35 spaced at intervals around the periphery of the kettle. This construction, including the two bottom walls 11 and 13 and the side wall 14 provides a base or foundation for the kettle of exceedingly rigid construction. The corrugating of the wall 6 takes care of the difference in contraction and expansion of the inner and outer walls of the kettle due to the different temperature conditions to which they are exposed, thus relieving the strain which would otherwise be imposed upon the kettle.

Figs. 3, 4 and 5 illustrate a simplified form of construction in which the feature of heating the bottom of the kettle by induction is omitted, such bottom being heated by the passage directly therethrough of a current of electricity. The construction follows that of Figs. 1 and 2 in that the current flows between the periphery of the bottom wall and its center so that when a plate of uniform thickness is employed as a bottom wall, a greater heating effect is secured at the central portion of the plate just as in the construction of Figs. 1 and 2.

Referring to the drawings, 36 is the inner side wall of the kettle; 37 is the outer side wall; 38 is the outer bottom wall of the device; 39 is a packing of asbestos or other insulating material; 40 is a lid of the device made up of the pair of spaced plates with interposed insulating material; 41 is the bottom wall or plate of the receptacle made of high resistance material such as nichrome; 42 is an annular terminal ring; and 43 and 44 are the leads by means of which current is caused to pass through the plate 41.

As indicated in Fig. 4, the terminal plate 42 is of annular form so that current is supplied from the lead 43 to the entire periphery of the high resistance plate 41. The connection at the center of the plate 41 is made as indicated in Fig. 5. A brass bolt is employed as this point having the threaded shank 45 extending through the plate 41 and the head 46 of conical form feeding the upper surface of the plate 41 and preferably brazed thereto. Below the plate 41 is the washer 47 bearing against the under side of the plate and pressed tightly in contact therewith by means of the nut 48. The lead 44 is secured to the shank 45 in any desired way.

Fig. 6 illustrates the application of the invention to a hot plate. In this construction the top plate 49 of high resistance material gradually increases in thickness from its periphery to its center in order to secure a uniform heating from center to circumference rather than an excess of heating at the center as in the kettle construction. The plate is preferably made of nichrome with an insulating medium 50 on its bottom side, such as asbestos plaster. Spaced beneath the plate 49 is a second plate 51 of copper, and between the two plates is the primary inducing coil 52. Perforated side walls 53 also of copper connect the plates at their peripheries and the parts are held together by means of the series of bolts 54 arranged at intervals around the circumference of the device. The plates 51 and 53 are made of relatively thick material as compared to the resistance plate 49 in order to carry the necessary current without overheating. A connection at the center of the two plates is provided in the form of the brass bolt 55 having its head seated in a recess in the plate 49 and its other end threaded and provided with the clamping nuts 56 and 57 lying above and below the plate 51. Surrounding the bolt 55 is a spacing sleeve 58 of copper. The bolt and sleeve together with the three plates 49, 51 and 53 constitute the secondary circuit, the bolts 54 also being preferably made of metal of high conductivity so as to assist in carrying the secondary current.

What I claim is:

1. In combination, a heating plate of high resistance material and connections whereby a flow of heating current is provided between the periphery of the plate and its central portion.

2. In combination, a receptacle having a wall for contacting with the contents of the receptacle of high resistance material, and connections whereby a heating current of electricity is caused to flow through such wall and heat it.

3. In combination, a receptacle having its bottom wall of high resistance material and connections whereby a heating current of electricity is caused to flow through such wall and heat it.

4. In combination, a receptacle having a metal bottom adapted to be heated by the passage of electrical current therethrough, and connections whereby a heating current is passed therethrough from the center to the outer portion thereof.

5. In combination, a receptacle having a bottom of high resistance material bulging downwardly and connections whereby a flow of heating current is provided between the periphery of such bottom and its central portion.

6. In combination, a heating plate of high resistance material constituting a part of a secondary coil or circuit arranged so that the current passes between the periphery of said plate and its central portion and heats it by its passage, and a primary exciting coil or circuit in operative relation to said secondary circuit.

7. In combination, a receptacle having a wall for contacting with the contents of the receptacle of high resistance material, a secondary circuit or coil of which said wall forms a part, and a primary exciting coil or circuit in operative relation to said secondary circuit.

8. In combination, a receptacle having its bottom wall of high resistance material, a secondary circuit or coil of which said wall forms a part, and a primary exciting coil or circuit in operative relation to said secondary circuit.

9. In combination, a receptacle having its bottom wall of high resistance material, a secondary circuit or coil of which said bottom wall forms a part arranged so that the current passes between the periphery of such wall and its central portion, and a primary exciting coil or circuit in operative relation to said secondary circuit.

10. In combination, a receptacle having its bottom wall of high resistance material, a second bottom wall below said bottom wall, connections between the centers and peripheries of the two walls so that such walls with the connections constitute a closed circuit and a primary exciting coil in the space between said walls and surrounding the central connection between them.

11. In combination, a receptacle having its bottom wall of high resistance material, a second bottom wall below said bottom wall, connections between the centers and peripheries of the two walls so that such walls with the connections constitute a closed circuit, heat insulating means on the lower side of the first bottom wall, and a primary exciting coil in the space between said walls and surrounding the connection between them.

12. In combination, a receptacle having its bottom wall of high resistance material, a second bottom wall below said bottom wall, connections between the centers and peripheries of the two walls so that such walls with the connections constitute a closed circuit, means for causing a flow of air through the space between the walls, and a primary exciting coil in such space adapted to induce a secondary heating current through said closed circuit.

13. In combination, a receptacle having its bottom wall of high resistance material, a second bottom wall below said bottom wall, an outlet pipe of conducting material leading through said walls at the center thereof, a side wall of conducting material between the peripheries of said walls, so that such walls with the side wall and pipe constitute a closed circuit, and a primary exciting coil in the space between the bottom walls and surrounding said outlet pipe.

14. In combination, a receptacle having a double side wall with an air space in said wall and with an inlet to said air space and an outlet therefrom, and means for forcing air through said inlet.

15. In combination, a receptacle having a double side wall with an air space therein, and a bottom wall of high resistance material and constituting a part of a secondary circuit, a primary exciting coil located beneath said bottom wall, and motor driven means for supplying air over the primary coil and through the air space in the side wall.

16. In combination, a receptacle having a double side wall with an air space therein, and a bottom wall of high resistance material and constituting a part of a secondary circuit, insulating material on the lower side of said bottom wall, other side and bottom walls below said bottom wall also constituting a part of said secondary circuit, a primary exciting coil located beneath said bottom wall, and motor driven means for supplying air over the primary coil and through the air space in the side wall.

In testimony whereof, I have hereunto subscribed my name this 21st day of March, 1923.

A. L. HARRINGTON.